United States Patent [19]

Stenzenberger et al.

[11] Patent Number: 5,120,824
[45] Date of Patent: Jun. 9, 1992

[54] ALKENYLPHENOXYIMIDE MODIFIED POLYIMIDE

[75] Inventors: Horst Stenzenberger, Schriesheim; Peter Koenig, Wiesloch, both of Fed. Rep. of Germany

[73] Assignee: Technochemie GmbH Verfahrenstechnik, Fed. Rep. of Germany

[21] Appl. No.: 452,731

[22] Filed: Dec. 20, 1989

[30] Foreign Application Priority Data

Dec. 23, 1988 [DE] Fed. Rep. of Germany ........ 3843641

[51] Int. Cl.⁵ .................. C08G 69/08; C08G 73/10; C08G 8/02; C08G 14/00
[52] U.S. Cl. .................. 528/322; 528/125; 528/128; 528/168; 528/171
[58] Field of Search ............ 528/125, 128, 168, 171, 528/321, 322

[56] References Cited

U.S. PATENT DOCUMENTS 4,100,140  7/1978  Zahir et al. .................. 526/277
4,211,861  7/1980  Stenzenbeger .............. 528/310

FOREIGN PATENT DOCUMENTS 2627045  6/1976  Fed. Rep. of Germany.
2754632  8/1977  Fed. Rep. of Germany.
1555564  12/1968  France.

*Primary Examiner*—John Kight, III
*Assistant Examiner*—T. Mosley

[57] ABSTRACT

Curable compositions, characterized in that they contain
(a) polyimides of the general formula (I)

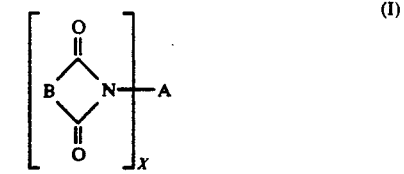

wherein B represents a divalent moiety containing a carbon-carbon double bond, and wherein A represents an X-valent, but at least divalent, moiety,
(b) alkenylphenoximides of the general formula (II)

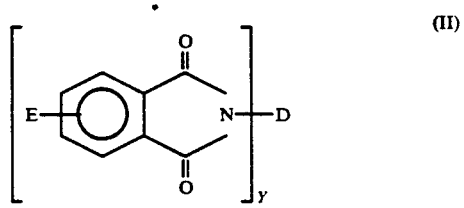

wherein D represents a Y-valent moiety, Y being 1, 2 or 3, and wherein E denotes a moiety having the following formulae

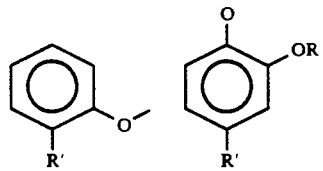

wherein R represents an alkyl group with 1 to 6 carbon atoms and R' represents a 1,2- or 2,3-alkenyl group with 3 to 8 carbon atoms.

16 Claims, No Drawings

ALKENYLPHENOXYIMIDE MODIFIED POLYIMIDE

The invention relates to curable compositions of polyimides of the general formula (I)

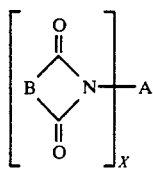

(I)

wherein B denotes a divalent moiety containing a carbon-carbon double bond and wherein A represents an X-valent, but at least divalent, moiety and alkenylphenoxyimides of the general formula (II)

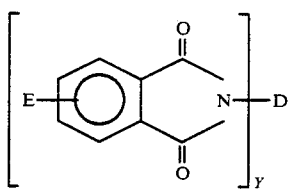

(II)

wherein D represents a Y-valent moiety, Y being 1, 2 or 3, and wherein E denotes a moiety having the following formulae

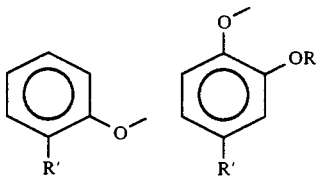

wherein R represents an alkyl group with 1 to 6 carbon atoms and R' a 1,2- or 2,3-alkenyl group with 3 to 8 carbon atoms.

Polyimides of the general formula (I) can be used in a variety of ways as a starting material for the preparation of polymerization and polyaddition products. The French patent specification 1,555,564 describes the polyaddition of N,N-bismaleimides with primary diamines and their thermal curing. In the German patent 2754 632.C2, amino acid hydrazides are pre-reacted with N,N'-bismaleimides and subsequently thermally cured. The cross-linked polymers obtained according to these patent specifications possess the disadvantages of many highly cross-linked duromer resins; in particular, they are very brittle.

German Offenlegungschrift 2627 045 describes a process for the preparation of cross-linked polymers comprising imide groups by reacting polyimides of the N,N'-bismaleimide type with alkenylphenols and/or alkenylphenol ethers, if necessary in the presence of polymerization catalysts. Examples given of suitable alkenylphenols are o,o'-diallylbisphenol-A, 4,4'-hydroxy-3,3'-allyldiphenyl, bis(4-hydroxy-3-allylphenyl)methane, 2,2'-bis(4-hydroxyl-3,5-diallylphenyl)-propane and eugenol. As a preferred embodiment, reaction products from 4,4'-bismaleimidophenyl methane and o,o'-diallylbisphenol-A are described.

The object of the present invention was to create curable resins comprising imide groups, which are both tough and thermally stable after polymerization.

This has been achieved by the compositions as claimed.

It was further discovered that the toughness and thermal stability of the curable resins containing imide groups according to the invention can be further increased if binuclear and mononuclear N,N'-bismaleimides are used as polyimide mixtures. In a preferred embodiment a mixture of 4,4'-bismaleimidodiphenylmethane and bismaleimidotoluene was used. It was further discovered that the ratio of polyimide to alkenylphenoximide can be varied within wide limits, but preferably 0.2–1.0 equivalents of alkenylphenoximide are used per equivalent of polyimide.

In polyimides that can be used in the framework of the invention and have the general formula (I),

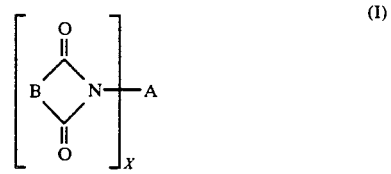

(I)

B represents a divalent organic moiety containing an ethylenic double bond. The following structures are possible for the B moiety.

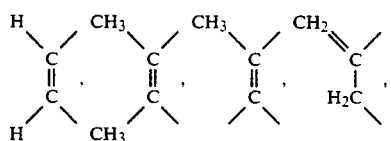

The moiety denoted A in the general formula (I) can be an X-valent moiety, but at least a divalent moiety, an alkylene group with up to 12 carbon atoms, a cycloalkylene group with 5 to 6 carbon atoms, a heterocyclic group with 5 to 6 carbon atoms and at least one nitrogen, oxygen or sulphur atom in the ring, a mono or dicarbocyclic group or at least two mono or dicarbocyclic aromatic or cycloalkylene groups which are interlinked by a direct carbon-carbon bond, or by a divalent moiety, namely oxygen, sulphur or an alkylene group with one to three carbon atoms, or one of the following groups expressed as formulae

—N=N—,

—N=N—,
 ‖
 O

—NR$_1$—,

—P(O)R$_2$—,

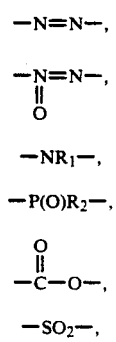

—SO$_2$—,

-continued

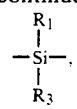

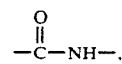

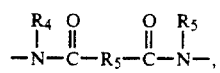

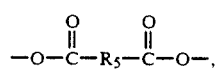

wherein the moieties $R_1$, $R_2$, $R_3$, $R_4$, $R_5$, are alkylene groups with one to five carbon atoms.

Examples of suitable bisimides for the preparation of new imide resins are 1,2-bismaleimidoethane, 1,6-bismaleimidohexane, 1,12-bismaleimidododecane, 1,6-bismaleimido-(2,2,4-trimethyl)-hexane, 1,3-bismaleimidobenzene, 1,4-bismaleimidobenzene, 4,4'-bismaleimidodiphenylmethane, 4,4'-bismaleimidodiphenyl ether, 4,4'-bismaleimidodiphenyl sulphone, 3,3'-bismaleimidodiphenyl sulphone, 4,4'-bismaleimidodicyclohexylmethane, 2,6-bismaleimidotoluene, N,N'-m-xylylene bismaleimide, N,N'-p-xylylene bismaleimide, N,N'-m-phenylene biscitraconimide, N,N'-4,4'-diphenyl citraconimide, N,N'-4,4'-diphenylmethane bisitaconimide.

Higher molecular weight bisimides of the general formula (III) can also be used,

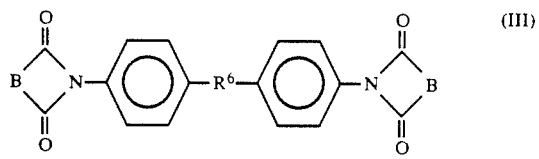

wherein $R^6$ represents a divalent moiety of the following groups expressed as formulae, such as

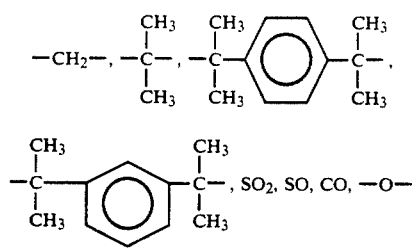

or

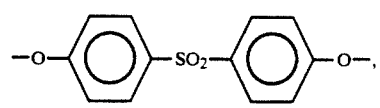

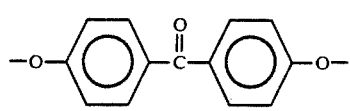

-continued

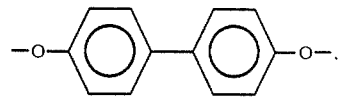

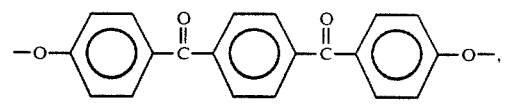

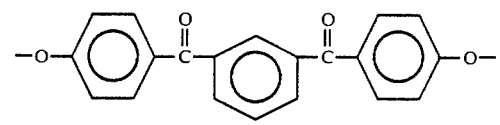

For the preparation of imide resins in accordance with the invention, compositions of two or more of the said bisimides can also be used.

Preferred bisimides are those which produce low melting point eutectic compositions, e.g. mixtures of 2,4-bismaleimidotoluene and 4,4'-bismaleimidodiphenylmethane or 2,4-bismaleimidoanisole and 4,4'-bismaleimidodiphenylmethane or 2,4-bismaleimidotoluene, 4,4'-bismaleimidodiphenylmethane and 2,2,4-trimethylhexamethylene bismaleimide. For the preparation of polyimides in accordance with the invention, compositions of the said eutectic bisimides with higher molecular weight bisimides of the general formula III

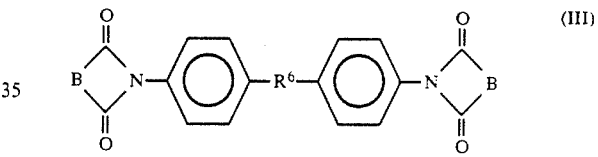

can be used.

The bisimides of the general formulae (I) and (III) can also be modified with polyamines, polyhydrazides, amino acid hydrazides, azomethines, polyisocyanates, polycyanates and other polyfunctional monomers co-reactive with bismaleimides. Reactive elastomers, such as acryl- or vinyl-terminated butadiene/acrylic nitrile co-polymers or carboxyl-group terminated acrylic nitrile butadiene rubbers and butadiene rubbers can also be used for further modification of the compositions in accordance with the invention.

The compositions in accordance with the invention can also be modified with thermoplastics, e.g. polyether sulphone, polysulphone, polycarbonate, polyhydantoin, polyether imide, polyimide, polyamidimide, polyether ketones, polyetherether ketones, polyesters, polyamides and aromatic polyesters.

The preparation of the new alkenylphenoximides of the general formula (II) takes place by reaction of bis-[3(4)-nitrophthalimides] with allylphenol or eugenol in the form of the sodium salt in a solvent as a nucleophilic exchange reaction. The preparation of the bis-nitrophthalimide is described in detail by D. M. White et al. in J. of Polymer Sci., Polym. Chem. Ed., Vol. 19, 1635–1663 (1981). Alkenylphenoxyimides of the general formula (II) are new and their preparation and properties have not been described in the literature. In these compounds Y is preferably 2, R preferably methyl and R' preferably 1,2- or 2,3-propenyl. The moiety D is preferably a divalent organic moiety selected from an alkylene group with up to 12 carbon atoms, a cycloalkylene group with 5 to 6 carbon atoms, a heterocyclic group with 4 to 5 carbon atoms and at least one nitrogen, oxygen or sulphur atom in the ring, a mono- or dicarbocyclic group or at least two mono- or dicarbocyclic aromatic or cycloalkylene groups, which are interlinked by a direct carbon-carbon bond, or by a divalent ligand, namely oxygen, sulphur or an alkylene group with one to three carbon atoms, or one of the following groups expressed as formulae

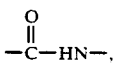

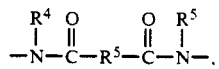

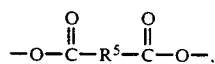

wherein the moieties $R^1$, $R^2$, $R^3$, $R^4$, $R^5$ are alkylene groups with one to five carbon atoms.

The divalent moiety —D— of the general formula (II) can also represent a divalent moiety of the general formula IV

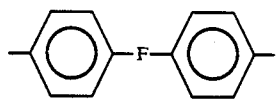
(IV)

wherein F denotes a divalent moiety of the following groups, expressed as formulae, such as

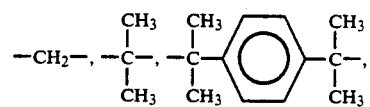

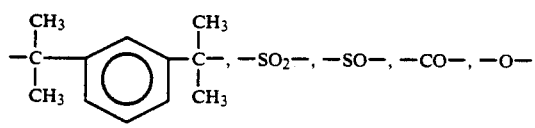

or

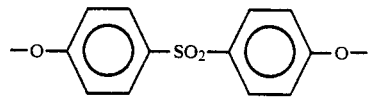

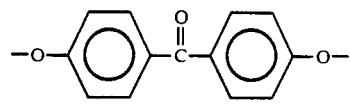

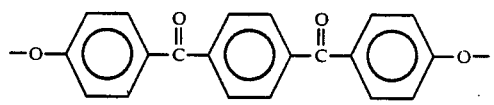

The reaction of, for example, 4,4'-bis-(3-nitrophthalimido)diphenylmethane with, for example, o-allylphenolsodium can take place in such a way that 4,4'-bis[3(2-allylphenoxy)phthalimodo]diphenylmethane is obtained as main product. This is the case if the reaction is carried out in dimethylsulphoxide as solvent at 65° C. within 30-60 minutes. At higher reaction temperatures and longer reaction times, considerable quantities of 4,4'-bis[3(2-propenylphenoxy)phthalimido]diphenylmethane are formed, which, if a corresponding reaction procedure is followed, will also be the main product. The allylphenoxyimides of the present invention are thus only accessible via allylphenols as starting products. The propenylphenoxyimides, on the other hand, can be prepared either from propenylphenols and bis-(nitrophthalimides) or by isomerization from the corresponding bis-(2-allylphenoxyphthalimides).

The preparation of the curable compositions in accordance with the invention is carried out according to the usual techniques of mixing melts, solutions and powders of the reactants. If further processing of the curable composition is carried out via the pre-preg process, the reactants in the melt, if necessary in the presence of an auxiliary solvent, are homogeneously mixed and the resulting melt or solution is used to impregnate fibres, fabrics, fleeces and other reinforcing fibres. The preparation of the mixtures of the curable compositions in accordance with the invention can also be carried out at elevated temperature, preferably at temperatures of between 80° and 200° C., producing prepolymers which, depending on the duration of the thermal prepolymerization, result in products which are either still soluble in organic solvents or are meltable, but are at least mouldable.

For the preparation of imide resins in accordance with the invention, compositions of two or more of the alkenylphenols or alkenylphenol ethers can also be used. Good results are also obtained, in accordance with the invention, by using compositions of one or more alkenylphenoximides in accordance with the invention with the mono- and binuclear alkylphenols described in German Offenlegungsschrift 2627 045 having the general formula (V).

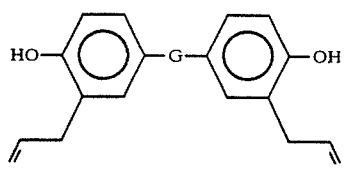

wherein G represents one of the moieties

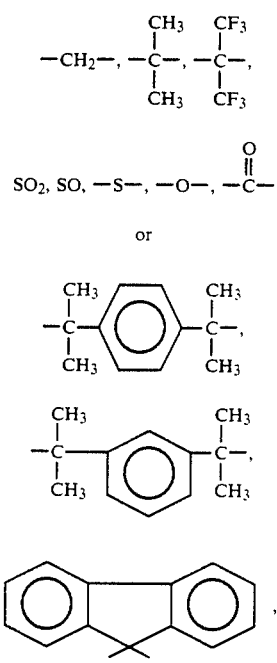

In a preferred embodiment, alkenylphenoximides are mixed with o,o-diallyl-bisphenol-A for the preparation of the imide resins in accordance with the invention.

Polymerization catalysts can be used for many industrial applications of the curable imides according to the invention. They should be present in the reaction mixture in a concentration of 0.01 to 10 percent by weight, preferably of 0.5 to 5 percent by weight, relative to the total quantity of reactants.

Of the ionic catalysts, tertiary, secondary, primary amines or amines containing several different kinds of amino groups (e.g. mixed tertiary-secondary amines) and quaternary ammonium compounds are particularly suitable in accordance with the invention. These amine catalysts can be both monoamines and polyamines. In the case of the use of primary and secondary amines, monoamines are preferred. The following substances are given as examples of such amine catalysts: diethylamine, tributylamine, triethylamine, triamylamine, benzylamine, tetramethyldiaminodiphenylmethane, N,N-diisobutylaminoacetonitrile, N,N-dibutylaminoacetonitrile, heterocyclic bases, such as quinoline, N-methylpyrrolidone, imidazol, benzimidazol and their homologues, and also mercaptobenzothiazol. Examples of suitable quaternary ammonium compounds are benzyltrimethylammonium hydroxide and benzyltrimethylammonium methoxide.

Further suitable ionic catalysts are alkali metal compounds, such as alcoholates and hydroxides of the alkali metals. Sodium methylate is particularly suitable.

The well known organic peroxides and hydroperoxides, as well as azoisobutylronitrile, are suitable as radical polymerization catalysts. Here as well, the preferred concentration is 0.1 to 5.0% by weight.

Further polymerization catalysts that can be used for the process in accordance with the invention are acetyl acetonates, in particular the acetyl acetonates of the transition metals.

The conversion of curable polyimides according to the invention into cross-linked (cured) products, if necessary in the presence of a curing catalyst, is carried out by heating to temperatures of 60° to 260° C., preferably 100°–250° C. The curing is usually carried out with simultaneous shaping into mouldings, sheet materials, laminates, glued structures, etc.

Curing of the polyimides according to the invention is usually carried out with simultaneous shaping into mouldings, sheet materials, laminates, glued structures, foam materials. The usual additives in curable plastics technology, such as fillers, plasticizers, pigments, colourings, release agents, flame-retardants, can be added to the curable substances. Some examples of suitable fillers are glass fibre, mica, graphite, quartz powder, kaolin, colloidal silica and metal powders. Examples of suitable release agents are silicone oil, various waxes, zinc stearate and calcium stearate.

Shaping can also be carried out by the hot-press process using a moulding press. It usually suffices to heat briefly to a temperature of 170° to 250° C. at a pressure of 1 to 200 kp/cm², and to complete the curing of the resulting moulding outside the press.

The polyimide resins in accordance with the invention are particularly suitable for use in the fields of moulding, surface protection, electrical engineering, lamination, glue-making, foam material production and in the building industry.

Processing of the curable polyimide resins in accordance with the invention can be carried out by moulding. For some uses it is necessary for the processing viscosity to be particularly low. In such cases it is possible to mix reactive diluents to the curable polyimide resins, preferably diluents which are liquid at room temperature.

Suitable reactive diluents contain one or more double bonds capable of polymerization having the general formula

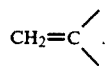

Suitable monomers are esters, ethers, hydrocarbons, substituted heterocyclic compounds or organometal or organometaloid compounds.

Examples of esters are allyl, metallyl, crotyl, isopropenyl and cinnamyl esters, derived from saturated or unsaturated aliphatic or aromatic mono or polycarboxylic acids, such as acetic acid, propionic acid, butyric acid, oxalic acid, malonic acid, succinic acid, adipic acid, sebacic acid, acrylic acid, methacrylic acid, phenylacrylic acid, crotonic acid, maleic acid, fumaric acid, citraconic acid, tetrahydrophthalic acid, itaconic acid, acetylene dicarboxylic acid, benzoic acid, phenyl acetic acid, o-phthalic acid, terephthalic acid, isophthalic acid, trimellitic acid, as well as the esters of unsaturated carboxylic acids with unpolymerizable alcohols, such as benzyl, isopropyl and 2-ethylhexyl esters.

Typical examples of esters are: allyl acetate, methyl acrylate and methacrylate, vinyl methacrylate, allyl maleate, allyl fumarate, allyl phthalate, allyl malonate, triallyl trimellitate and allyl trimesate.
Suitable ethers include
vinyl allyl ether, diallyl ether,
dimethallyl ether and allyl crotyl ether.

Some possible substituted heterocyclic compounds are vinylpyridine, N-vinylpyrrolidone, N-vinylcarbazole, allyl isocyanurate, allyl cyanurate, vinyl tetrahydrofurane, vinyl dibenzofurane, allyloxy tetrahydrofurane and N-allyl capropactam.

Hydrocarbons can also be used, such as styrene, α-methylstyrene, p-chlorostyrene, divinylbenzene, diallylbenzene or vinyltoluene.

Of the monomeric organometals and organometalloid derivates, special emphasis is given to those which contain one or more phosphorus, boron or silicon atoms. These could be silanes or siloxanes, phosphines, phosphine oxides or sulphides, phosphates, phosphites, phosphonates, boranes, orthoborates, boronates, boroxoles, borazoles and phosphazenes. Some examples are 1,3-diallylltetramethyldisiloxane, phenyldimethylallylsilane, allyldimethylphosphinoxide, allylorthophosphate, allylmethyl phosphonate, triallylborazole, triallylboroxole and triallyltrichlorophosphazene.

Furthermore, the monomers of the various aforementioned categories can contain halogen atoms, in particular chlorine or fluorine, or functional groups such as an alcoholic or phenolic hydroxyl group, an aldehydic or ketonic carbonyl group, an amido group, an epoxy group or a cyano group.

Some examples of polymerizable monomers which contain such substituents are allyloxyethanol, p-allyloxyphenol, tetrallylepoxyethane, glycidyl acrylate, glycidyl methacrylate, allyl glycidyl ether, p-cyanostyrene, acrylamide, N-methacrylamide, N-allyl acrylamide, N-methylol acrylamide, methylacrylonitrile, p-chlorostyrene, p-fluorostyrene and β-hydroxyethyldiallyl cyanurate.

The curable compositions in accordance with the invention can also be cured in two stages. After mixing the bisimides with the selected alkenylphenol, the solution is heated to a temperature of 120°-170° C. for a limited period of time. A prepolymerizate is formed in this way which is still thermally mouldable and, if necessary, can still be dissolved in an organic solvent.

The prepolymer can be ground to a powder before the final curing is carried out, if necessary after adding powdery fillers, such as quartz powder, aluminium oxide, carbon powder, etc.

The preparation of prepolymers can also be carried out by heating a solution or suspension of the starting materials (bisimide+alkenylphenoximide).

In the following examples, typical curable compositions of polyimides and alkenylphenols are described and some mechanical properties reported. Any modifications, desired increases in the quantities of starting materials and the corresponding adjustment of technical apparatus can easily be carried out.

EXAMPLE 1

Preparation of 4,4'-bis[3(2-allylphenoxy)-phthalimido]diphenylmethane 72.1 g o-allylphenol in 420 ml toluene was added to 96.6 g sodium methylate solution and rotated for 30 minutes in a rotary evaporator at 65° C., then concentrated under vacuum to a residue.

The residue was dissolved in 560 ml dimethylsulphoxide (solution 1). 140 g 4,4'-bis(3-nitrophthalimido)diphenylmethane was made into a suspension in 400 ml toluene in a four-necked flask fitted with a stirrer. To this was added solution 1 through a dropping funnel and the reaction mixture was stirred at 55° C. for 6 hours. 1500 ml toluene and 1000 ml water was added, stirred thoroughly and then the aqueous phase separated in a separating funnel. The toluene phase was washed three more times with 1000 ml water, after which 1000 ml toluene was distilled off, the remaining mixture was heated for 15 minutes under reflux, then forced through Celite and the filtrate mixed with 150 ml isopropanol under stirring. The resulting precipitate was filtered off, washed with a small amount of isopropanol and dried at 70° C. in a forced-air drying cabinet.

Yield: 125.2 g of 4,4'-bis[3(2-allylphenoxy)phthalimido]diphenylmethane
Melting point: 174°-178° C. (Tottoli)

Remarks

It was established by means of H-NMR spectroscopy that the product contained about 4% of 4,4'-bis[3(2-propenylphenoxy)phthalimido]diphenyl methane.

EXAMPLE 2

Preparation of 4,4'-bis[4(2-allylphenoxy)phthalimido]diphenylmethane

This was prepared in an analogous manner as example 1, except that 4,4'-bis(4-nitrophthalimido)diphenylmethane was used as starting material.
Yield: 71% of theoretical
Melting point: 88°-190° C. (Tottoli)

EXAMPLE 3

Preparation of 4,4'-bis[3(o-methoxy,p-allylphenoxy)phthalimido]diphenyl methane

This was prepared in an analogous manner as example 1, except that o-methoxy-p-allylphenol (eugenol) was used as starting material instead of o-allylphenol.
Melting point: ≦230° C. (Tottoli)

EXAMPLE 4

Preparation of 2,4'-bis[3(2-allylphenoxy)phthalimido]toluene 250 ml toluene, 192 g sodium methylate solution (... %) and 143 g o-allylphenol were rotated for 30 minutes in a rotary evaporator at 65° C., then concentrated (towards the end under vacuum) to a residue which was then dissolved in 1200 ml dimethylsulphoxide (solution 1).

240 g of 2,4'-bis(3-nitrophthalimido)toluene and 1200 ml toluene were transferred into a four-necked flask fitted with a stirrer, a dropping funnel, a thermometer and a reflux cooler, and to this was added solution 1. This was stirred for 10 hours at 55° C. 1500 ml toluene and 1500 ml water were then added and the mixture was stirred well, after which the aqueous phase was separated in a separating funnel. The toluene phase was washed five times with 500 ml water at 60° C. The toluene phase was then concentrated by distillation at atmospheric pressure to a residue.

Yield: 301.6 g (approx. 91.8% of theoretical)
Melting point: 78°–85° C. (Tottoli)

EXAMPLES 5 AND 6

The following allylphenyl compounds were prepared in an analogous manner as described in example 1 and example 4.

3,3′-bis[3(2-allylphenoxy)phthalimido]diphenylsulphone, melting point 171°–178° C.

1,6′-bis[3(2-allylphenoxy)phthalimido]hexane, melting point 106°–108° C.

EXAMPLE 7

150 g of a bismaleimide mixture consisting of 105 g 4,4′-bismaleimidodiphenylmethane, 45 g 2,4-bismaleimidotoluene and 150 g 4,4′-bis[3(2-allylphenoxy)phthalimido]diphenylmethane was melted in a round-bottomed flask under stirring at 140° C. The melt was briefly degassed under vacuum and then poured into steel trays and cured under pressure (4 bar) for 1 hour at 160° C., 3 hours at 180° C. and 4 hours at 210° C. After removal from the moulds, the resin slabs were tempered for 5 hours at 240° C.

Properties

| Bending strength | at 23° C.: | 125 MPa |
| Bending strength | at 250° C.: | 103 MPa |
| Bending modulus | at 23° C.: | 3.994 GPa |
| Bending modulus | at 250° C.: | 3.002 GPa |
| Breaking energy ($G_{IC}$) | at 23° C.: | 480 Joule/m$^2$ |

EXAMPLE 8

150 g of a bismaleimide mixture consisting of 105 g 4,4′-bismaleimidodiphenylmethane, 45 g 2,4-bismaleimidotoluene and 100 g 4,4′-bis[3(2-allylphenoxy)phthalimido]diphenylmethane was melted and homogenized in a round-bottomed flask on a rotary evaporator at 145° C. The melt was degassed for a few minutes under vacuum, then poured into steel trays and cured under pressure (4 bar) for 1 hour at 160° C., 3 hours at 180° C. and 4 hours at 210° C. After removal from the moulds, the resin slabs were tempered for 5 hours at 240° C.

Properties

| Bending strength | at 23° C.: | 110 MPa |
| Bending strength | at 250° C.: | 89 MPa |
| Bending modulus | at 23° C.: | 4.09 GPa |
| Bending modulus | at 250° C.: | 2.69 GPa |
| Breaking energy ($G_{IC}$) | at 23° C.: | 281 Joule/m$^2$ |

EXAMPLE 9

150 g of a bismaleimide mixture consisting of 105 g 4,4′-bismaleimidodiphenylmethane, 45 g 2,4-bismaleimidotoluene and 90 g 2,4′-bis[3(2-allylphenoxy)phthalimido]toluene was melted and homogenized in a round-bottomed flask on a rotary evaporator at 145° C. The melt was degassed for a few minutes and then poured into steel trays and cured under a pressure of 4 bar for 1 hour at 160° C., 3 hours at 180° C. and 4 hours at 210° C. After removal from the moulds, the resin slabs were tempered for 5 hours at 240° C. in a forced-air cabinet.

Properties

| Bending strength | at 23° C.: | 94 MPa |
| Bending strength | at 250° C.: | 61 MPa |
| Bending modulus | at 23° C.: | 4.235 GPa |
| Bending modulus | at 250° C.: | 2.946 GPa |
| Breaking energy ($G_{IC}$) | at 23° C.: | 237 Joule/m$^2$ |

EXAMPLE 10

A resin mixture consisting of 105 g 4,4′-bismaleimidodiphenylmethane, 45 g 2,4-bismaleimidotoluene, 136.25 g bis[3(2-allylphenoxy)-phthalimido]toluene was processed into resin slabs in an analogous manner as described in example 9.

Properties

| Bending strength | at 23° C.: | 99.5 MPa |
| Bending strength | at 250° C.: | 85.7 MPa |
| Bending modulus | at 23° C.: | 4.001 GPa |
| Bending modulus | at 250° C.: | 2.946 GPa |
| Breaking energy ($G_{IC}$) | at 23° C.: | 395 Joule/m$^2$ |

EXAMPLE 11

150 g of a bismaleimide mixture consisting of 105 g 4,4′-bismaleimidodiphenylmethane, 45 g 2,4-bismaleimidotoluene, 49.5 g 2,4′-bis[3(2-allylphenoxy)phthalimido]toluene and 49.5 g 4,4′-bis(o-propenylphenoxy)benzophenone was melted in a round-bottomed flask under stirring at 140° C. The melt was briefly degassed under vacuum and then poured into steel trays and cured under pressure (4 bar) for 1 hour at 160° C., 3 hours at 180° C. and 4 hours at 210° C. After removal from the moulds, the resin slabs were tempered for 5 hours at 240° C.

Properties

| Bending strength | at 23° C.: | 101 MPa |
| Bending strength | at 250° C.: | 76 MPa |
| Bending modulus | at 23° C.: | 3.891 GPa |
| Bending modulus | at 250° C.: | 2.656 GPa |
| Breaking energy ($G_{IC}$) | at 23° C.: | 241 Joule/m$^2$ |

EXAMPLE 12

150 g of a bismaleimide mixture consisting of 105 g 4,4′-bismaleimidodiphenylmethane, 45 g 2,4-bismaleimidotoluene, 49.5 g 2,4′bis[3(2-allylphenoxy)phthalimido]toluene and 49.5 g o-allylphenol-1,3-bisglycidylresorcinol adduct (prepared as described in the British patent application 8518380, example 4) was melted and homogenized in a round-bottomed flask on a rotary evaporator at 145° C. The melt was degassed for a few minutes.

Properties

| Bending strength | at 23° C.: | 128 MPa |
| Bending strength | at 250° C.: | 81 MPa |
| Bending modulus | at 23° C.: | 3.934 GPa |

| | | |
|---|---|---|
| Bending modulus | at 250° C.: | 2.228 GPa |
| Breaking energy (G$_{IC}$) | at 23° C.: | 187 Joule/m$^2$ |

EXAMPLE 13

150 g of a bismaleimide mixture consisting of 105 g 4,4'-bismaleimidodiphenylmethane, 45 g 2,4-bismaleimidotoluene, 49.5 g 2,4'-bis[3(2-allylphenoxy)phthalimido]toluene and 49.5 g o,o'-diallylbisphenol A was melted in a round-bottomed flask at 140° C. under stirring. The melt was briefly degassed under vacuum and then poured into steel trays and cured under pressure (4 bar) for 1 hour at 160° C., 3 hours at 180° C. and 4 hours at 210° C. After removal from the moulds, the resin slabs were tempered for 5 hours at 240° C.

Properties

| | | |
|---|---|---|
| Bending strength | at 23° C.: | 92 MPa |
| Bending modulus | at 23° C.: | 4.255 GPa |
| Breaking energy (G$_{IC}$) | at 23° C.: | 269 Joule/m$^2$ |

EXAMPLE 14

150 g of a bismaleimide mixture consisting of 105 g 4,4'-bismaleimidodiphenylmethane, 45 g 2,4-bismaleimidotoluene, and 75 g o,o'-diallylbisphenol A and 37.5 g N-phenyl,3-(2-allylphenoxy)phthalimide was melted in a round-bottomed flask at 140° C. under stirring. The melt was briefly degassed under vacuum and then poured into steel trays and cured under pressure (4 bar) for 1 hour at 160° C., 3 hours at 180° C. and 4 hours at 210° C. After removal from the moulds, the resin slabs were tempered for 5 hours at 240° C.

Properties

| | | |
|---|---|---|
| Bending strength | at 23° C.: | 167 MPa |
| Bending modulus | at 23° C.: | 3.83 GPa |
| Breaking energy (G$_{IC}$) | at 23° C.: | 358 Joule/m$^2$ |

We claim:

1. A curable composition comprising
(a) polyimides of the formula (I)

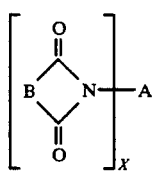
(I)

wherein X ranges from 2 to 6 and B represents a divalent moiety containing a carbon-carbon double bond, and wherein A represents an X-valent, but at least divalent, moiety, and (b) alkenylphenoximides of the formula (II)

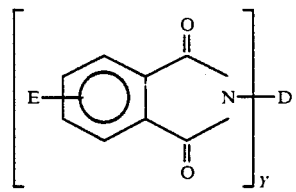
(II)

wherein D represents a Y-valent moiety, Y being 1, 2 or 3, and wherein E denotes a moiety having the following formulae

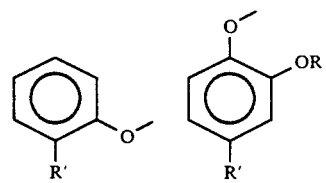

wherein R is an alkyl group with 1 to 6 carbon atoms and R' is a 1,2- or 2,3-alkenyl group with 3 to 8 carbon atoms.

2. The composition of claim 1, wherein said components (a) and (b) are present in such a ratio that per polyimide equivalent 0.05 to 20 mol alkenylphenoximide is present.

3. The composition of claim 1, wherein said divalent organic moiety B of formula (I) is a moiety having a formula selected from the group consisting of:

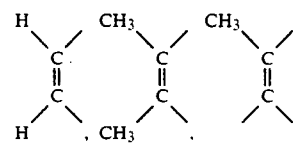

and

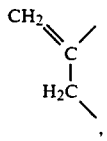

4. The composition of claim 1, wherein moiety A in formula (I) is selected from the group consisting of an alkylene group with up to 12 carbon atoms, a cycloalkylene group with 5 to 6 carbon atoms, a heterocyclic group with 4 to 5 carbon atoms and at least one nitrogen, oxygen or sulfur atom in the ring, a mono- or dicarbocyclic group and at least two mono- or dicarbocyclic aromatic or cycloalkylene groups, which are interlinked by a direct carbon-carbon bond or by a divalent group selected from oxygen, sulfur, alkyl with 1 to 3 carbon atoms, or a group selected from the group consisting of:

—N=N—,

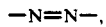

-continued $-NR^1-$, $-P(O)R^2$, $$-\overset{\overset{O}{\|}}{C}-O-$$

$-SO_2-$, $$-\underset{\underset{R^3}{|}}{\overset{\overset{R^1}{|}}{Si}}-,$$

$$-\overset{\overset{O}{\|}}{C}-HN-,$$

$$-\underset{\underset{}{|}}{\overset{\overset{R^4}{|}}{N}}-\overset{\overset{O}{\|}}{C}-R^5-\overset{\overset{O}{\|}}{C}-\underset{\underset{}{|}}{\overset{\overset{R^5}{|}}{N}}-,$$

and $$-O-\overset{\overset{O}{\|}}{C}-R^5-\overset{\overset{O}{\|}}{C}-O-,$$

wherein the moieties $R^1$, $R^2$, $R^3$, $R^4$, $R^5$ are alkyl groups with 1 to 5 carbon atoms.

5. The composition of claim 1, wherein the polyimide of formula (I) is a bisimide of the formula (III)

$$B\underset{\underset{O}{\|}}{\overset{\overset{O}{\|}}{\diagup}}N-\text{[Ar]}-R^6-\text{[Ar]}-N\underset{\underset{O}{\|}}{\overset{\overset{O}{\|}}{\diagdown}}B \quad (III)$$

wherein $R^6$ represents a divalent moiety selected from the group consisting of $$-CH_2-, -\underset{\underset{CH_3}{|}}{\overset{\overset{CH_3}{|}}{C}}-, -\underset{\underset{CH_3}{|}}{\overset{\overset{CH_3}{|}}{C}}-\text{[Ar]}-\underset{\underset{CH_3}{|}}{\overset{\overset{CH_3}{|}}{C}}-,$$

$$-\underset{\underset{CH_3}{|}}{\overset{\overset{CH_3}{|}}{C}}-\text{[Ar]}-\underset{\underset{CH_3}{|}}{\overset{\overset{CH_3}{|}}{C}}-, SO_2, SO, CO, -O-,$$

$-O-\text{[Ar]}-SO_2-\text{[Ar]}-O-$, $-O-\text{[Ar]}-\overset{\overset{O}{\|}}{C}-\text{[Ar]}-O-$, $-O-\text{[Ar]}-\text{[Ar]}-O-$, -continued $-O-\text{[Ar]}-\overset{\overset{O}{\|}}{C}-\text{[Ar]}-\overset{\overset{O}{\|}}{C}-\text{[Ar]}-O-$.

and $-O-\text{[Ar]}-\overset{\overset{O}{\|}}{C}-\text{[Ar]}-\overset{\overset{O}{\|}}{C}-\text{[Ar]}-O-$.

6. The composition of claim 1, wherein said polyimide comprises a mixture of bismaleimides of the formulae (I) and (III).

7. The composition of claim 6 wherein said polyimide comprises a mixture of 4,4-bismaleimidodiphenylmethane and 2,4-bismaleimidotoluene.

8. The composition of claim 1, wherein said Y in formula (II) is 2.

9. The composition of claim 1, wherein R in formula (II) is methyl.

10. The composition of claim 1, wherein in formula (II) R' is 1,2- or 2,3-propenyl.

11. The composition of claim 1, wherein in formula (II) the moiety D represents a divalent moiety selected from the group consisting of an alkylene group with up to 12 carbon atoms, a cycloalkylene group with 5 to 6 carbon atoms, a heterocyclic group with 4 to 5 carbon atoms and at least one nitrogen, oxygen or sulfur atom in the ring, a mono- or dicarbocyclic group or at least two mono- or dicarbocyclic aromatic or cycloalkylene groups, which are interlinked by a direct carbon-carbon bond or by a divalent ligand, selected from the group consisting of oxygen, sulfur or an alkylene group with 1 to 3 carbon atoms, or a group selected from the group consisting of $-N=N-$, $$-\underset{\underset{O}{\downarrow}}{N=N}-,$$

$-NR^1-$, $-P(O)R^2$, $$-\overset{\overset{O}{\|}}{C}-O-$$

$-SO_2-$, $$-\underset{\underset{R^3}{|}}{\overset{\overset{R^1}{|}}{Si}}-,$$

$$-\overset{\overset{O}{\|}}{C}-HN-,$$

$$-\underset{\underset{}{|}}{\overset{\overset{R^4}{|}}{N}}-\overset{\overset{O}{\|}}{C}-R^5-\overset{\overset{O}{\|}}{C}-\underset{\underset{}{|}}{\overset{\overset{R^5}{|}}{N}}-,$$

and

-continued

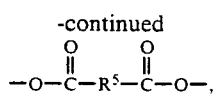

wherein the moieties R¹, R², R³, R⁴, R⁵ are alkylene groups with 1 to 5 carbon atoms.

12. The composition of claim 1, wherein in formula (II) the moiety D represents a divalent moiety of formula (IV)

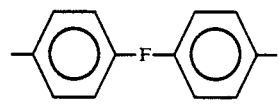

(IV)

wherein F denotes a divalent moiety selected from the group consisting of

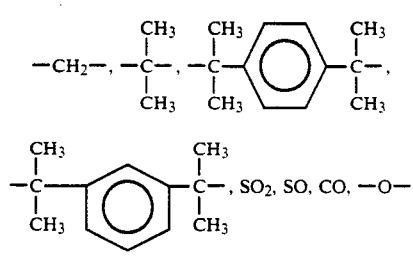

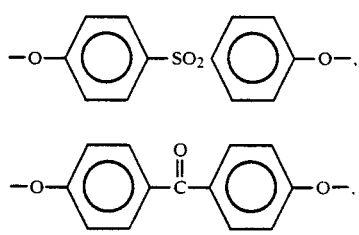

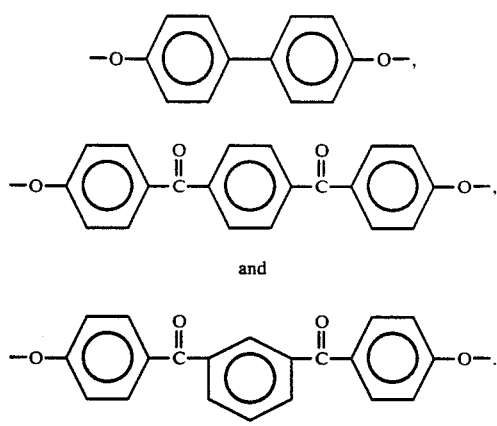

and

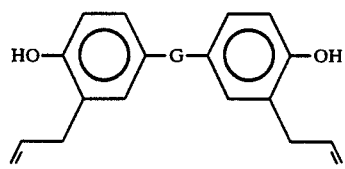

13. The composition of claim 1, further containing a multinuclear compound of formula (V)

(V)

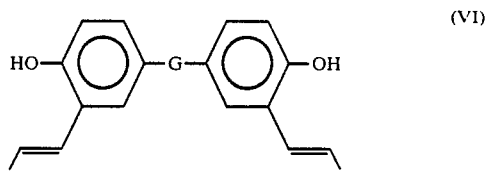

in which G represents a moiety selected from the group consisting of

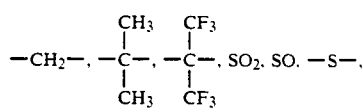

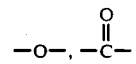

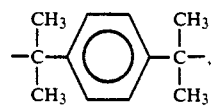

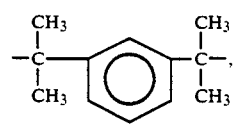

and

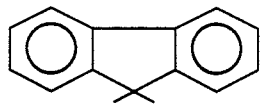

14. The composition of claim 1, further comprising a multinuclear compound of formula (VI)

(VI)

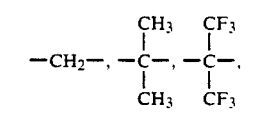

wherein G is selected from the group consisting of-

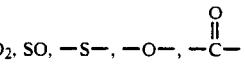

$SO_2$, SO, —S—, —O—, —C—
           $\overset{O}{\underset{\|}{}}$

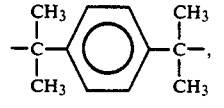

and

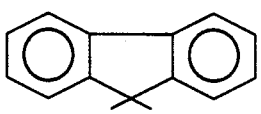

15. The composition of claim 1, wherein X=2.

16. Alkenylphenoxyimides having the general formula (II)
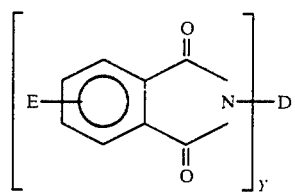
in which D, Y and E have the meaning as defined in claim 1.
* * * * *